June 8, 1948.　　　O. SUTTLES　　　2,442,831
CASTER SUSPENDING AND CUSHIONING DEVICE
Filed Oct. 4, 1946
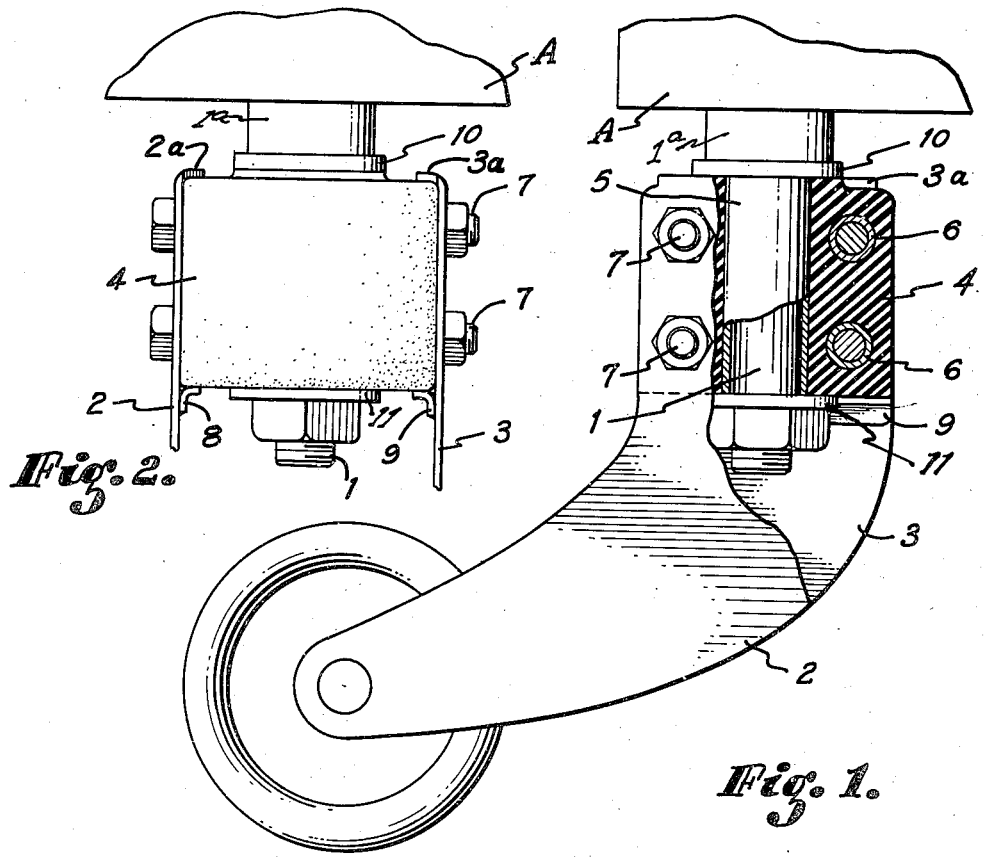
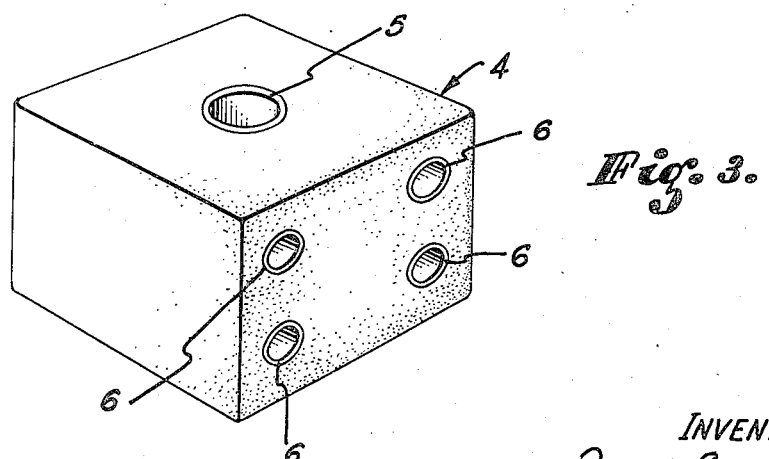
INVENTOR:
OMAR SUTTLES
ATTORNEY Patented June 8, 1948

2,442,831

UNITED STATES PATENT OFFICE 2,442,831

CASTER SUSPENDING AND CUSHIONING DEVICE

Omar Suttles, Los Angeles, Calif.

Application October 4, 1946, Serial No. 701,236

6 Claims. (Cl. 16—44)

1

This invention relates to casters such as used on furniture, floor trucks, automobile trailers and the like and has particular reference to improvement in yielding suspensions for such casters.

It is common practice, where casters are used on trailers or other road vehicles, pivotally to join the caster fork to the body of the vehicle and to employ a spring yieldingly to maintain the caster in normal operating position and capable of absorbing the shocks which the vehicle is subjected to during its passage over the road's surface. Such spring suspensions have been found not completely satisfactory for various reasons, and the present invention contemplates a novel form of caster suspension designed to give more satisfactory and longer lasting service. To this end, the invention resides in the combinations hereinafter fully described and reference is invited to the accompanying drawings in which a preferred form of the invention is illustrated.

In the drawings:

Fig. 1 is a side elevational view of a caster combination embodying the invention and with a portion thereof broken away for the sake of clearness.

Fig. 2 is a substantially corresponding front view of the upper portion of the device of Fig. 1, and Fig. 3 illustrates the shock absorbing element of the device as it appears when removed therefrom.

In the drawings the reference character A denotes a portion of a vehicle body to the bottom of which is rigidly secured a stud 1. This stud includes an enlarged upper portion 1a which is welded or otherwise rigidly secured to the vehicle body. A block 4, of resilient material such as rubber, is perforated to ride on this stud and a bushing 5 is molded into this block to serve as an antifriction bearing. This bushing or sleeve may be made from any suitable bearing material, such as bronze or the like.

A plurality of metal tubes 6 are molded into the rubber block and they extend transversely through the block on opposite sides of the bearing sleeve. The ends of these tubes, as well as the ends of the bearing sleeve, are substantially flush with the outer surface of the block.

The caster wheel is pivotally mounted between plates 2 and 3, which are shaped at the upper end thereof to fit against the sides of the block, and they are made with perforations for registration with the tubes 6 of the block.

Bolts 7 extend through the tubes and the perforations of the fork plates for the purpose of clamping the latter rigidly against the ends of the tubes, and the stud 1 is threaded at the lower

2 end thereof to receive a threaded nut, which locks the block firmly in position on the stud. The threaded portion of the stud should be smaller in diameter than the main portion thereof so as to provide a shoulder against which the nut comes to rest, substantially as indicated in Fig. 1, and it is noticed that thrust washers 10 and 11 mounted on the stud to bear against the ends of the bushing 5 so as to form better end bearing surfaces therefor.

In order to maintain the block 4 more securely in position between the fork plates it is noticed that the upper edges of the latter have been bent inwardly to form flanges 2a, 3a. Also that angle bars 8, 9 are fastened to the inner surfaces of the fork plates similarly to maintain the bottom edges of the block in position.

From the foregoing description it is seen that I have provided a simple, inexpensive and efficient device for yieldingly maintaining a caster wheel suspended from a vehicle body and this device will cushion the shock caused by the uneven surface or obstacles along the road surface while, at the same time, leaving the caster fork free to rotate on the stud.

I claim:

1. For use on a vehicle, a caster suspending device comprising, a stud rigidly affixed to the vehicle body and downwardly directed therefrom, a block made from resilient material and perforated to ride on said stud, a pair of plates seatable against opposite sides of said block, bolts extending through the block and the said plates to clamp the plates in position thereon, and a caster pivotally supported between said plates at the lower ends thereof.

2. For use on a vehicle, a caster suspending device comprising, a shouldered stud on the vehicle body, a block of resilient material perforated to ride on said stud, a bearing sleeve molded into said block and positioned between the block and stud to form a bearing therefor, a pair of side plates shaped to rest against opposite sides of said block, there being aligned perforations transversely through the block and the said plates, bushings in the transverse perforations of the block, bolts extending through said bushings and the said perforations to clamp the plates rigidly against the ends of said bushings, a pivot seated in the lower ends of plates, and a caster mounted to rotate on said pivot.

3. A device for maintaining a caster suspended from a vehicle body comprising, a pendent shouldered stud secured to said body, a perforated resilient block, a bearing sleeve seated in the perforations of said block to ride on said stud, means seatable on the lower end of said stud and engaging the end of said sleeve to lock the sleeve and block rotatable in position on the stud, a pair of plates seatable against opposite sides of the block, the said plates and the block having aligned transverse perforations therethrough, bushings seated in the transverse block perforation, bolts extending through said transverse perforations to clamp on the plates rigidly against the ends of the bushings, and a caster rotatably mounted on said pivot.

4. Means maintaining a caster suspended from a vehicle body comprising, a pendent shouldered stud rigidly secured to said vehicle, the lower ends of said stud being reduced in diameter and provided with screw threads, a block of resilient material having a perforation extending vertically through the center thereof and a plurality of transverse perforations arranged on opposite sides of said center perforation, bearing bushings molded into all of said block perforations and extending the full distance therethrough, a threaded nut seated on the threaded end of said stud against the lower shoulder thereof to lock the block and the vertically disposed bushing therein rotatably in position on the stud, a pair of plates seatable against the sides of the block and having perforations for registration with said transverse block perforations, bolts extending through said perforations to clamp the plates rigidly against the ends of said transverse bushings, and a caster pivotally mounted in the ends of said plates.

5. A device for maintaining a caster suspended from a vehicle body comprising, a pendent shouldered stud secured to underside of said vehicle, the end of said stud being reduced in diameter and provided with screw threads, a resilient block having a central vertical perforation, a bearing bushing molded into said perforation to ride on said stud, a threaded nut seatable on the screw threads of the stud and engaging the lower shoulder thereof to maintain the block and the bushing therein rotatably locked in position on the stud, thrust washers on the stud contacting the ends of said bushing, a plurality of sleeves transversely extended through the block on each side of the stud, a pair of plates seatable against the sides of the block and having perforations in alignment with said sleeves, bolts extending through the sleeves and the plate perforations to clamp the plates rigidly against the ends of the sleeves, the plates having inwardly projecting flanges riding against the upper and lower surfaces of the block, and a caster mounted for rotation in the ends of said plates.

6. For attachment to a vehicle having a stud pendent therefrom, a caster fork comprising a substantially square resilient block, a bearing sleeve vertically rising through said block, caster fork side plates, means clamping said plates to opposite side surfaces of the block, spacers extending through the block and spanning the distance between said plates, the latter having flanges inwardly projecting over the top and bottom edges of the block, and means maintaining the parts rotatably secured to the stud.

OMAR SUTTLES.

REFERENCES CITED

The following references are of record in the file of this patent:

UNITED STATES PATENTS

| Number | Name | Date |
|---|---|---|
| 1,614,894 | Nelson et al. | Jan. 18, 1927 |
| 1,930,067 | Tibbetts | Oct. 10, 1923 |